Dec. 30, 1958 — T. W. JACKSON — 2,866,618
REVERSE FLOW AIR COOLED TURBINE BLADE
Filed Feb. 13, 1953

INVENTOR
THOMAS W. JACKSON
BY
ATTORNEYS

United States Patent Office 2,866,618
Patented Dec. 30, 1958

2,866,618

REVERSE FLOW AIR COOLED TURBINE BLADE

Thomas W. Jackson, Cincinnati, Ohio

Application February 13, 1953, Serial No. 336,899

2 Claims. (Cl. 253—39.15)

(Granted under Title 35, U. S. Code (1952), sec. 266)

The invention described herein may be manufactured and used by or for the Government of the United States of America for governmental purposes without the payment of any royalties thereon or therefor.

This invention relates to turbine blades with special application to blade cooling.

In turbine blades an outstanding problem frequently is maintenance of blade temperatures below values causing excessive deterioration of the blade metal, heat effects being most pronounced at the leading and trailing edges. In prior cooling methods the blades have been made hollow and cooling air passed from root to tip from a common drum manifold of the turbine wheel. Also, film cooling has been utilized by closing the tip end of the hollow blade and forcing air through slots or holes on the sides and edges of the blades. Defects in these methods lie in inefficient use of the coolant with reduced heat transfer and improper distribution of the cooling medium, so that frequently the leading edge of the blade is overheated.

Generally stated, the present invention overcomes the defects mentioned by increasing the velocity and hence the cooling effect of coolant flow, by localizing air movement adjacent the blade edges and by extending the period of coolant contact by reversal of the air stream.

A principal object of the invention therefore, is to provide turbine blade cooling means which will be effective at the leading and trailing edges as well as side blade areas. An object also is to provide blade cooling means which employs advantageously both forced convectional cooling and film cooling. An additional object is to utilize not only forced convectional cooling but also free convectional cooling as well as the cooling effects resulting from metal conduction.

Other objects and advantages of this invention will become apparent on reference to the following detailed description and accompanying drawing wherein.

Figure 1:
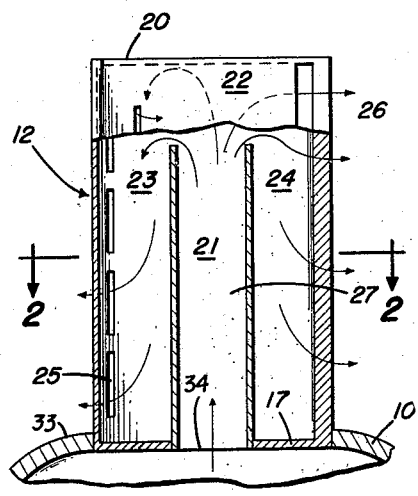
Fig. 1 is an elevation of a turbine blade, in section, showing the direction of coolant flow.

The usual turbine construction includes a hub or drum having radial blades thereon, there being a shaft connection to the drum with means of rotation thereof. In Fig. 1, the drum 10 is shown hollow and appropriate connection (not shown) made between the drum at its base 33 and a source of coolant, as air under pressure.

The blade 12 follows the usual turbine blade conformation, with a rounded leading edge 13 and a sharply tapered trailing edge 14, with intermediate curved walls 15 and 16 of different convexity forming an efficient aerodynamic profile. The blade is hollow throughout with the blade ends closed by base and tip plates 17 and 20. An opening extends transversely across the central area of base plate 17; and at this opening imperforate transverse ribs 18 and 19 extend outwardly into the blade interior. These ribs terminate short of the tip plate 20 of the blade so that a duct or passageway 27 is formed extending from the central base plate opening 34, through the space 21 formed by the ribs 18 and 19 to the rib ends. The space 21 is extended around the top rib ends in space 22 and in reverse direction toward the base plate 17 in the spaces 23 and 24 adjacent the leading and trailing blade edges, respectively. Outlets for space 23 are provided in radial openings or slots 25 formed at the approximate intersection of curved walls 15 and 16; and an outlet for space 24 is provided in the radial slot 26 formed at the extreme trailing edge of the inner convex curved wall 16, as described in my copending application Serial Number 333,022 filed January 23, 1953 now Patent No. 2,755,061.

It is now evident that when a gas coolant such as air, is forced into the blade from the drum 10, it is conducted as a single stream through space 21 to space 22 where it divides into two streams, one flowing through space 23 and out of slots 25 and the other through space 24 and out of slot 26, the flow through slots 25 being possible since the coolant air pressure is in excess of the turbine air pressure. Outside of slots 25 the air coolant forms an external film on the blade sides so that heat transfer takes place on both faces of each blade side. In addition, the in-coming air in space 21 cools the center sections of the blade curved side walls, the air flowing past the tip in space 22 cools this blade area, and air flowing in space 24 cools the trailing blade edge.

It is here pointed out that improved cooling is due broadly to air flow reversal in the blade so that, in contrast with the one pass structures of prior use, full effect of the coolant passage is obtained. In addition, instead of the usual relatively slow air flow, rapid air movement is obtained, thus giving increased cooling, since, in general, the higher the air velocity the higher the heat transfer coefficient. Moreover, the construction is such as to localize air flow at the highly heated leading and trailing edges, and due to the central lead-in of coolant and flow adjacent the relatively cooler side walls of the blade, the air arrives at the tip end with substantial capacity for heat transfer in the edge spaces.

A factor of importance in the blade cooling is the co-action of the forced and free convectional air movements. Due to the excessive heat absorption of the blade as effective in the interior passage ways there is a marked tendency for convectional air currents to flow from the tip to the root. Inside the rib space 21 this tendency is not so marked since the air is still relatively cool, and hence the opposition to the forced flow of coolant is relatively small. However, in spaces 23 and 24 these free convectional currents are more pronounced, but here their direction coincides with the forced air and this adds to the cooling effect.

Figure 4:
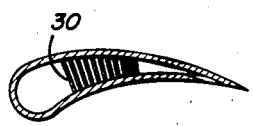
Fig. 4 is a sectional view similar to Fig. 2 of a third modification showing longitudinal ribs in the center blade tube.
Figure 5:
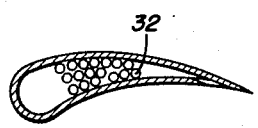
Fig. 5 is a view similar to that of Fig. 4 but showing small tubes in place of ribs.

In short, the described structure provides increased and effective cooling by extended air contact brought about by flow reversal, by utilization of both free and forced convectional air flow, and by film formation on the external blade surface. If desired, an additional cooling factor may be added by use in rib space 21 of partitions in the shape of plural ribs 30 as shown in Fig. 4 or tubes 32 as shown in Fig. 5, whereby a heat reservoir is formed cooling the blade edges and sides by conduction.

Figure 3:
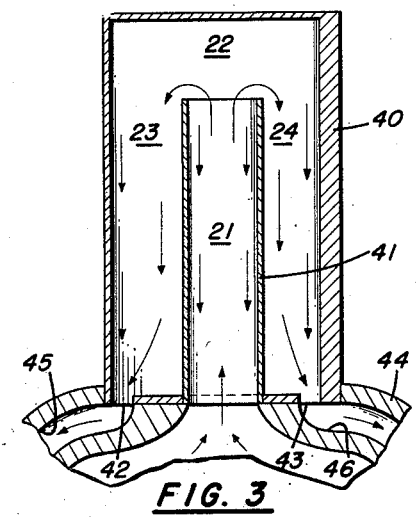
Fig. 3 is a sectional elevational view having a modified form of blade cooling structure.
Figure 2:
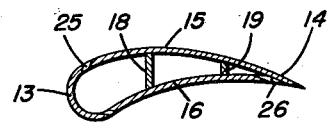
Fig. 2 is a section through the blade along lines 2—2 of Fig. 1.

The showing of Fig. 3 illustrates a modified blade 40 in which a central tube 41 is used instead of ribs, the flow being from the tube end to outlet ports 42 and 43, positioned respectively, at the base end of leading and trailing edges and leading into the drum by means of corner exits 45 and 46, where appropriate outlet connection is made. By this construction, coolant air, after reversing on exit from tube 41 sweeps by the leading and trailing edges respectively in passage to the base corner exits 45 and 46.

Obviously other modifications and variations of this invention are possible in the light of the disclosure and hence the invention may be practiced otherwise than as specifically described.

What is claimed is:

1. In a gas turbine, a hollow rotatable drum having a base, said drum being adapted to receive a compressed air coolant, a hollow radial blade having a base and extending from and attached at said base to the base of said drum, said blade having a closed tip, a rounded leading edge and a tapered trailing edge, and a plurality of ribs centrally and radially positioned in said blade and forming a passageway and connected to said drum for passage of air coolant into said blade, said ribs being imperforate and terminating adjacent the closed tip of the blade and said blade having outlet openings for said incoming coolant only at points adjacent the leading and trailing blade edges, whereby the coolant is moved with reduced heat transfer to the vicinity of the blade tip and subsequently moved reversely toward the blade base in direct proximity to both leading and trailing edges.

2. The apparatus as defined in claim 1, with the trailing edge opening being singular and the leading edge openings lying on both sides of the extreme forward limit of said leading edge, whereby a coolant film is formed on both of the outer sides of said blade.

References Cited in the file of this patent

UNITED STATES PATENTS

| | | |
|---|---|---|
| 2,236,426 | Faber | Mar. 25, 1941 |
| 2,447,095 | Schmidt | Aug. 17, 1948 |
| 2,647,368 | Triebbnigg | Aug. 4, 1953 |
| 2,679,669 | Kempe | June 1, 1954 |
| 2,701,120 | Stalker | Feb. 1, 1955 |

FOREIGN PATENTS

| | | |
|---|---|---|
| 319,622 | Great Britain | Dec. 18, 1930 |
| 619,634 | Great Britain | Mar. 11, 1949 |
| 651,787 | Great Britain | Apr. 11, 1951 |
| 711,419 | France | June 30, 1931 |
| 897,709 | France | June 5, 1944 |